D. W. L. FRANK, Sr.
COMBINED LEVEL, PLUMB, AND GRADE FINDER.
APPLICATION FILED OCT. 26, 1911.
1,036,601.
Patented Aug. 27, 1912.
2 SHEETS—SHEET 1.
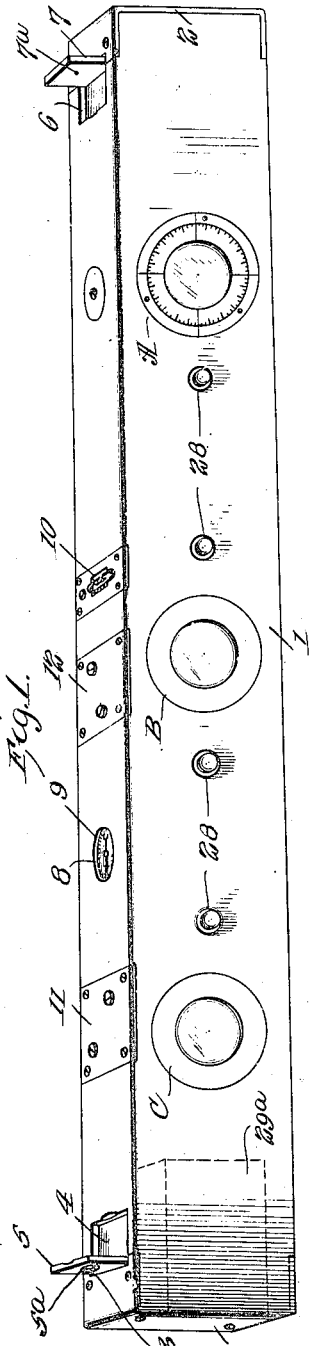
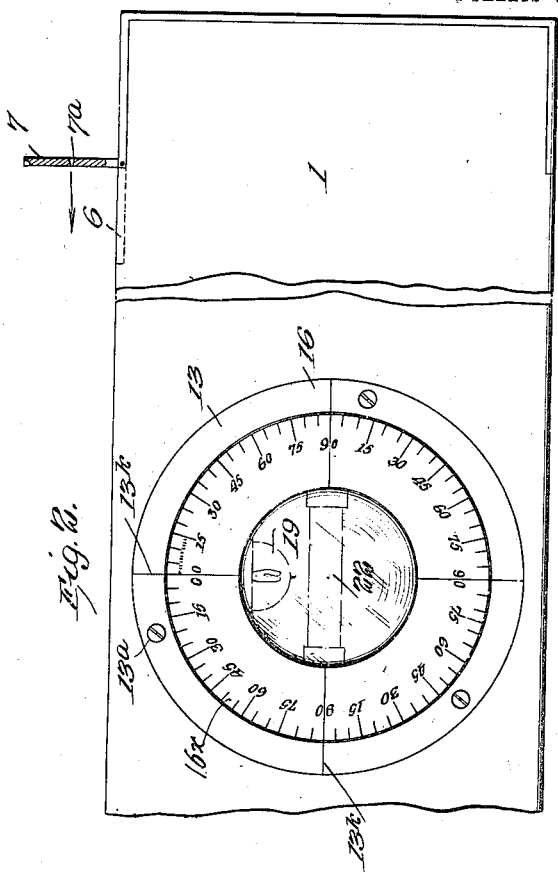
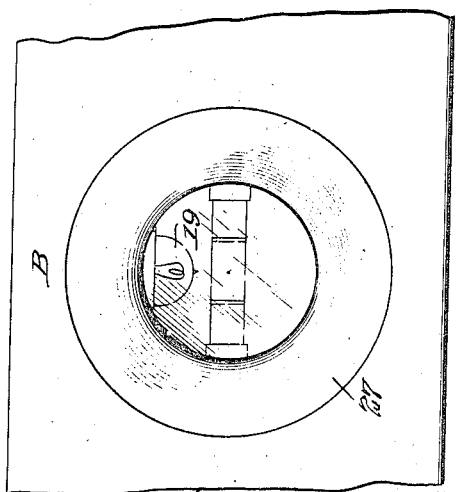
WITNESSES
INVENTOR
DANIEL W. L. FRANK Sr.
BY Munn & Co.
ATTORNEYS D. W. L. FRANK, Sr.
COMBINED LEVEL, PLUMB, AND GRADE FINDER.
APPLICATION FILED OCT. 26, 1911.
1,036,601.
Patented Aug. 27, 1912.
2 SHEETS—SHEET 2.
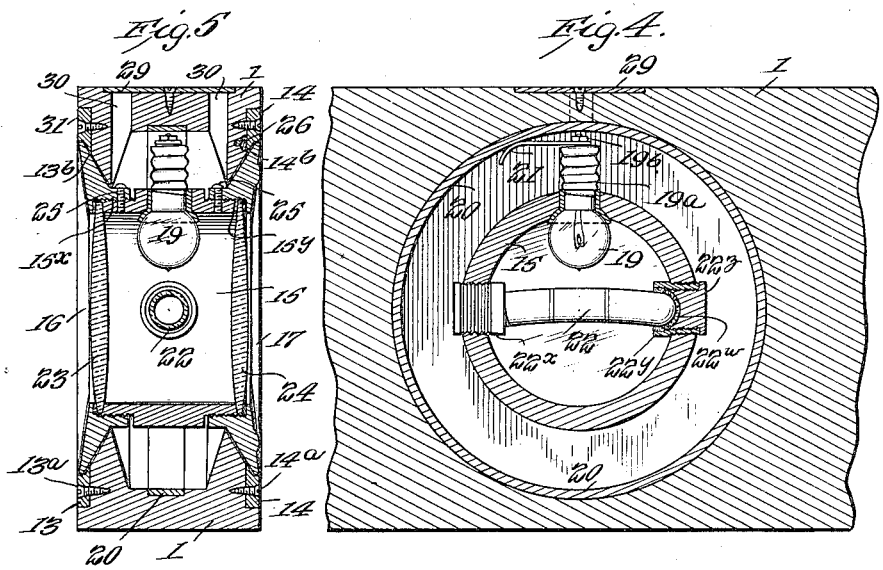
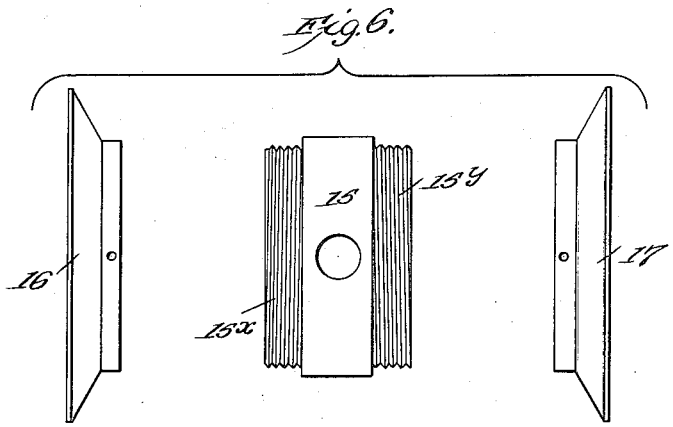
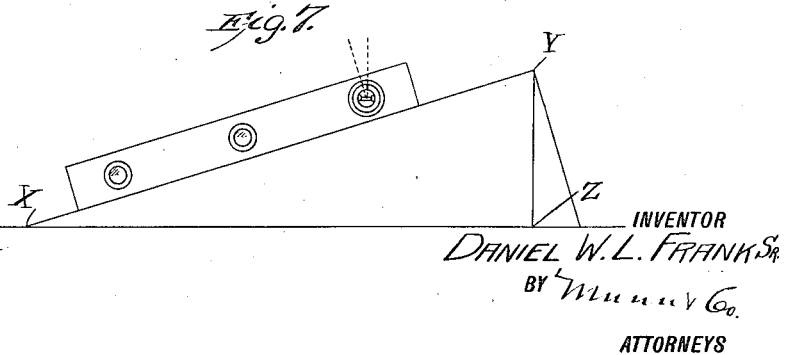
WITNESSES
E. M. Callaghan
L. A. Stanley
INVENTOR
DANIEL W. L. FRANK Sr.
BY Munn v Co.
ATTORNEYS

UNITED STATES PATENT OFFICE.

DANIEL W. L. FRANK, SR., OF CHICAGO, ILLINOIS.

COMBINED LEVEL, PLUMB, AND GRADE-FINDER.

1,036,601.   Specification of Letters Patent.   Patented Aug. 27, 1912.

Application filed October 26, 1911. Serial No. 656,809.

*To all whom it may concern:*

Be it known that I, DANIEL W. L. FRANK, Sr., a citizen of the United States, and a resident of Chicago, in the county of Cook and State of Illinois, have made certain new and useful Improvements in Combined Levels, Plumbs, and Grade-Finders, of which the following is a specification.

My invention relates to improvements in combined plumbs, levels, and grade finders, and it consists in the combinations, constructions and arrangements herein described and claimed.

An object of my invention is to provide a device which will combine in one instrument several different instruments for use in finding levels, grades, directions, etc.

A further object of my invention is to provide an improved means for finding grades or determining the angles of slopes. This I do by means of what I term an "inclinometer," which is used in connection with the level, compass, etc.

A further object of my invention is to provide means for protecting spirit levels from dust and injury, and at the same time to provide means for magnifying these spirit levels so that they can be easily read.

A further object of my invention is to provide means for lighting the spirit levels, these means consisting of electric lamps which are inclosed within the instrument adjacent to the spirit levels and by the use of which the spirit levels may be observed at night.

Other objects and advantages will appear in the following specification and the novel features of the device will be particularly pointed out in the appended claims.

My invention is illustrated in the accompanying drawings forming part of this application in which—

Figure 1 is a perspective view of the instrument, Fig. 2 is an enlarged detail view of one end of the device, showing the inclinometer, Fig. 3 is a detail view of a portion showing the casing for the horizontal spirit level, Fig. 4 is a section through the level and the inclinometer casing, Fig. 5 is a section at right angles to Fig. 4, Fig. 6 is a detail view showing parts of the inclinometer frame, and Fig. 7 is a diagrammatical view showing the use of the inclinometer.

In carrying out my invention, I provide a block 1 of wood or other suitable material having the metal protecting strips 2 and 3 at the ends thereof. This block forms the body portion of the level. Near one end is a recess 4, in which the forward sight 5 is arranged to be held. The sight is hinged at one end and is arranged to swing upwardly into the position shown in Fig. 1, and when in this position the plane of the sight is at right angles to the plane of the upper portion of the block 1. At the opposite end is a similar recess 6 having a hinged back sight 7 arranged to be swung upwardly into a position parallel with the front sight 5. The back sight 7 is provided with a small opening $7^a$, while the front sight 5 has a larger opening $5^a$ provided with cross hairs $5^b$. It will be understood that the center of the opening $7^a$ and the point of intersection of the cross hairs $5^b$ are exactly the same distance from the upper surface of the body portion 1 of the level.

At 8 is a compass which is countersunk beneath the upper surface of the level.

At 10 is a spirit level which runs transversely of the block 1 and the purpose of which is to bring the upper side edges of the top of the block 1 into horizontal alinement.

The plates 11 and 12 form means for effecting certain circuit connections, as will be explained later.

The block 1 is hollowed out toward one end to provide room for what I term an "inclinometer." The latter is shown in Fig. 1 at A. The construction of this device is best seen from Figs. 2, 4 and 5. On one side of the body portion 1 of the level is a countersunk ring 13, which is secured to the block or body portion by means of screws $13^a$. A similar ring 14 is provided on the opposite side, and is held by screws $14^a$. These rings are both beveled on their inner sides, as shown at $13^b$ and $14^b$. In Figs. 5 and 6, I have shown a cylinder 15 having reduced threaded end portions $15^x$ and $15^y$, these threaded end portions being arranged to be engaged by the beveled rings 16 and 17 respectively, which are secured to the reduced portions as shown in Fig. 5.

An electric light bulb 19 is provided with a base $19^a$ which extends through an opening in the cylinder 15, one of the terminals $19^b$ of the base being in contact with a ring 20 by means of a spring 21.

A spirit level 22 is provided and is slightly curved so as to enable the operator to center the air bubble. The level 22 is held in a pair of threaded sleeves or nipples 22$^x$ and 22$^y$ respectively carried by the cylinder 15, these nipples being arranged to receive plugs such as that shown at 22$^z$, a piece of resilient packing 22$^w$ being interposed to prevent injury to the glass. It is obvious that by unscrewing the holding device at one end and screwing it up at the other, the position of the spirit level may be adjusted and that the glass tube may be easily taken out if it should become broken.

In order to provide a dust proof casing for the spirit level 22 and at the same time to provide magnifying glasses by means of which the position of the bubble may be readily seen, I provide the lenses such as those shown at 23 and 24, these lenses being held between the ends of the cylinder 15$^x$ and 15$^y$ and shoulders on the rings 16 and 17, suitable packing being interposed to prevent injury to the lenses. The rings 16 and 17 are secured to the cylinder 15 by means of screws such as those shown at 25 in Fig. 5. The rotation therefore of the rings 16 or 17 will cause a rotation of the cylinder and the lamp 19 will be carried around, but one terminal thereof will be in constant contact with the ring 20.

At 26, I have shown a permanent terminal which is in connection with the storage battery and against which the ring 14 bears when the latter is secured into position. The ring 17, however contacts with the ring 14 in any position in which it may be rotated, and therefore is in electrical connection with the terminal 26 at all times.

The outer conducting portion of the base of the electric bulb is in electrical connection with the ring 17 through the medium of the cylinder 15. It will thus be seen that both the ring 20 and the terminal 26 are in constant electrical connection with the lamp 19 no matter in what position it may be.

On reference to Fig. 2, it will be seen that the ring 16 is divided up into quadrants, each quadrant being 90° and that a scale, such as that shown at 16$^x$, is provided. The ring 13 may also be provided with lines or scales such as those shown at 13$^k$. It will be obvious that these scales may be more or less elaborate, and it will be understood that in explaining this device applicant has used a simple scale, although more elaborate scales might be used without departing in the least from the spirit and the scope of the invention.

At B and C I have shown holders for the horizontal and vertical spirit levels which are made in a somewhat similar manner to the inclinometer already described, the main difference lying in the fact that they have no outer rings such as that shown at 13 and 14 and that the rings 27 which correspond to the rings 16 and 17 are not secured to the cylinder by means of screws such as that shown at 25 which extend into the cylinder 15. Otherwise the construction is similar to that indicated in Fig. 5. As stated however B is a holder for a horizontal spirit level and C the holder for the vertical spirit level.

The electric lights 19 which illuminate the spirit levels are each provided with a push button such as that shown at 28. A storage battery 29$^a$ is carried by the body portion for generating current for the lamps. The wiring for the lamps and the push buttons forms no part of this invention, the lamps being wired in the ordinary manner.

From the foregoing description of the various parts of the device the operation thereof may be readily understood. It may be used as an ordinary level by noting the position of the air bubble in the spirit level carried at B. Vertical edges may be determined by means of the spirit level carried at C. It may be used for surveying purposes or running lines or levels at a distance by first getting the instruments in a horizontal position through the medium of the horizontal spirit level at B, and the transverse spirit level at 10. The compass at 8 gives the direction of the line, the elevation of different objects being found by means of the sights 5 and 7.

The use of the device as a grade finder involves the use of the inclinometer. The means by which this is accomplished is best shown in Fig. 7. Let the problem be to find the angle which the inclined surface X—Y makes with the horizontal line X—Z. The device is laid on the surface X—Y and the rings 16 and 17 are turned so as to bring the air bubble into the center of the spirit level. The angle Y—X—Z may then be read directly from the scale on the inclinometer which shows how far out of the normal position the rings must be rotated in order to bring the spirit level in a horizontal position. This is only an instance of one of the numerous uses to which this device may be put.

The lenses 16 and 17 serve not only for inclosing the spirit levels to protect them from dust or injury, but they serve as magnifying glasses so as to render the reading of the level easy. The electric lights serve to illuminate the levels when it is too dark to see them. I desire to call attention to the fact that the lamp is carried around with the level, and is therefore always in the proper position with respect to the level, and that owing to the construction the lamp may be revolved without breaking the circuit connections.

Another novel feature lies in the construction of the holders for the spirit levels. Consider Fig. 5. If it is desired to take out the holder the plate 29 may be be unscrewed and one of the screws 25 may be moved by thrusting a screw-driver into the openings 30. The rings 16 and 17 may then be unscrewed and access will be had to the interior. In assembling these parts, it is only necessary to reverse the operation. In replacing one of the spirit levels at B or C, it is only necessary to unscrew one of the members 27 to obtain access to the interior, the lens coming out when the ring is removed.

The materials of which the various parts are made may be varied and modifications based on the same general principle may be made without departing from the spirit and the scope of the invention.

I claim:—

1. In a combined level and grade finder, a rectangular body portion having a transverse opening therethrough, a metal ring secured to the body portion at each end of said transverse opening, a cylinder disposed centrally of said transverse opening, a ring secured to each end of said cylinder, a lens carried between each of said rings and the adjacent end of the cylinder, and a spirit level disposed within said cylinder at right angles to the axis thereof.

2. In a combined level and grade finder, a rectangular body portion having a transverse opening therethrough, a metal ring secured to the body portion at each end of said transverse opening, a cylinder disposed centrally of said transverse opening, a ring secured to each end of said cylinder, a lens carried between each of said rings and the adjacent end of the cylinder, a spirit level disposed within said cylinder at right angles to the axis thereof, an electric light bulb carried by said cylinder, and a pair of stationary contacts, one of said stationary contacts being in electrical connection with the terminal of the lamp in any position of the cylinder and the other of the contacts being in electrical connection with one of said rings in any position of the cylinder.

3. In a combined level and grade finder, a rectangular body portion having a transverse opening therethrough, a metal ring secured to the body portion at each end of said transverse opening, one of said metal rings having indicating marks on its edges, a cylinder disposed centrally of said transverse opening, a ring secured to each end of said cylinder, one of said last named rings being provided with marks on its outer edge adapted to register with the marks on the inner edge of the first named ring, a lens carried between each of said rings and the adjacent end of the cylinder, and a spirit level disposed within said cylinder at right angles to the axis thereof.

4. In a combined level and grade finder, a rectangular body portion having a transverse opening therethrough, a rotatable cylinder disposed in said transverse opening, beveled end rings for said cylinder arranged to engage the body portion for preventing displacement of the cylinder, a pair of sleeves carried by said cylinder, a spirit level disposed within said cylinder, the ends of said spirit level being carried by said sleeves, and means for adjusting the position of the spirit level with respect to the sleeves.

5. In a combined level and grade finder, a rectangular body portion having a transverse opening therethrough, a rotatable cylinder disposed in said transverse opening, beveled end rings for said cylinder arranged to engage the body portion for preventing displacement of the cylinder, a pair of sleeves carried by said cylinder, a spirit level disposed within said cylinder, the ends of said spirt level being carried by said sleeves, and means for adjusting the position of the spirit level with respect to the sleeves, said means comprising a screw plug carried by each of said sleeves.

DANIEL W. L. FRANK, Sr.

Witnesses:
 John L. Corcoran,
 Geo. W. Stein.